United States Patent
Banyas

(10) Patent No.: US 6,877,774 B2
(45) Date of Patent: Apr. 12, 2005

(54) TUBULAR HONEYCOMB ARTICLES FOR USE IN ENERGY ABSORPTION

(75) Inventor: George Banyas, San Leandro, CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 10/154,664

(22) Filed: May 22, 2002

(65) Prior Publication Data

US 2003/0218326 A1 Nov. 27, 2003

(51) Int. Cl.$^7$ .............................. B62D 1/11; F16F 7/12
(52) U.S. Cl. ...................................................... 280/777
(58) Field of Search ......................................... 280/777

(56) References Cited

U.S. PATENT DOCUMENTS

| | | | |
|---|---|---|---|
| 3,130,819 A | 4/1964 | Marshall | |
| 3,228,492 A | 1/1966 | Blumrich | |
| 3,980,314 A | * 9/1976 | Kopf | 280/777 |
| 4,643,448 A | 2/1987 | Loren | 280/777 |
| 5,609,364 A | 3/1997 | Fouquet et al. | 280/777 |
| 5,984,354 A | 11/1999 | Kim | 280/777 |
| 6,264,240 B1 | 7/2001 | Hancock | 280/777 |

FOREIGN PATENT DOCUMENTS

| | | |
|---|---|---|
| EP | 0 157 500 A1 | 10/1985 |
| EP | 0 429 320 A1 | 5/1991 |

OTHER PUBLICATIONS

Bitzer, T., Honeycomb Technology (Materials, Design, Manufacturing, Applications and Testing), Chapman & Hall Publs., pps. 19–21.

Product Data: HexWeb™ Tube–Core® Energy Absorption Cylinder, by Hexcel Composites.

* cited by examiner

Primary Examiner—Teri P. Luu
Assistant Examiner—Bret Hayes

(57) ABSTRACT

A tubular honeycomb article for use in absorbing energy. The article is made by taking a planar honeycomb and forming it into a tube shaped honeycomb body. The tube shape of the honeycomb body is retained by providing a shell around the perimeter of the honeycomb body. The resulting tubular honeycomb article may be used as an insert or collar in automotive steering columns to provide absorption of energy during occupant loading in an frontal crash.

20 Claims, 2 Drawing Sheets

TUBULAR HONEYCOMB ARTICLES FOR USE IN ENERGY ABSORPTION

BACKGROUND OF THE INVENTION

1. Field of the Invention

The present invention relates generally to systems for absorbing energy during an impact. More particularly, the present invention is directed to energy absorbing devices that are used in connection with automotive steering columns for energy management during collisions. Even more specifically, the present invention involves the use of tubular honeycomb articles in collapsible steering columns for absorbing energy when the column collapses axially during occupant loading in a frontal crash.

2. Description of Related Art

There has been and continues to be intense interest in protecting occupants of automobiles from the steering wheel and steering column during crashes. A great deal of effort has been devoted to designing steering wheels and steering columns which absorb energy when the driver impacts the steering wheel during a collision. The need for a driver-friendly steering wheel and steering column is especially critical in frontal crashes where the driver is rapidly accelerated towards the steering wheel and steering column.

Numerous different approaches have been taken to reduce the severity of occupant-steering column impacts during frontal collisions. One approach has been to make the steering column collapsible when subjected to impact forces that occur during a crash. Exemplary energy absorbing steering columns are described in U.S. Pat. Nos. 4,643,448; 5,609,364; and 6,264,240 B1. The development of driver-side airbags has drastically improved the safety of drivers during frontal collision. However, even though driver-side airbags have been particularly effective in protecting the driver from impacts with the steering wheel and steering column during frontal collisions, there still is a need to design steering wheels and steering columns which collapse or otherwise absorb and manage energy during collisions.

SUMMARY OF THE INVENTION

In accordance with the present invention, a tubular honeycomb article is provided that is useful in absorbing energy during an impact. The tubular honeycomb device or article is especially well suited for absorbing energy between two impact members which are located at either end of the tubular honeycomb article. The tubular honeycomb article is particularly effective when the impact members are part of a steering system for a vehicle.

Tubular honeycomb articles of the present invention generally include a honeycomb body having an inner cylindrical face and an outer cylindrical face that define the radial width of the honeycomb body. The honeycomb body also includes a first axially extending face and a second axially extending face that define the length of the honeycomb body. Further, the honeycomb body includes a first end face and a second end face that define the axial thickness of the honeycomb body. The honeycomb body is shaped as a tube so that the first and second axial faces extend axially adjacent to each other. The resulting honeycomb body includes an inner cylindrical face that defines a cylindrical opening extending axially through the tube shaped honeycomb body. As a feature of the present invention, it was discovered that generally planar honeycomb having a given length, width and thickness could be formed into tubular honeycomb articles of the present invention by forming them around a mandrel.

As a further feature of the present invention, a shell is located around at least a portion of the outer cylindrical face of the honeycomb body to provide containment of the honeycomb body in its tubular shape. Tubular honeycomb articles made in this manner are relatively easy and simple to fabricate and reduce the amount of waste that occurs when tubular honeycomb bodies are machined from planar honeycomb.

The tubular honeycomb articles of the present invention are designed to absorb energy between a first impact member and a second impact member. The first impact member is located adjacent to the first end face of the honeycomb body with the second impact member being located adjacent to the second end face. During impacts, the two impact members move towards each other resulting in crushing of the tubular honeycomb body in an axial direction. As is well known, honeycomb is an efficient energy absorber when crushed. The tubular honeycomb article is especially well suited for insertion into a steering column or other steering mechanism that includes a steering wheel connected to a steering shaft that extends through the steering housing or column. In accordance with the present invention, the steering shaft extends through the cylindrical opening in the tube shaped honeycomb body. During an impact, the first end face of the honeycomb body is contacted by the steering mechanism with the second end face being impacted by the housing for the steering mechanism as the steering mechanism collapses into the housing. The movement of the steering mechanism (i.e., first impact member) within the housing (second impact member) causes axial crushing of the tubular honeycomb body which results in absorption of impact energy.

The above described and many other features and attendant advantages of the present invention will become better understood by reference to the following detailed description when taken in conjunction with the accompanying drawings.

DETAILED DESCRIPTION THE INVENTION

Figure 1:
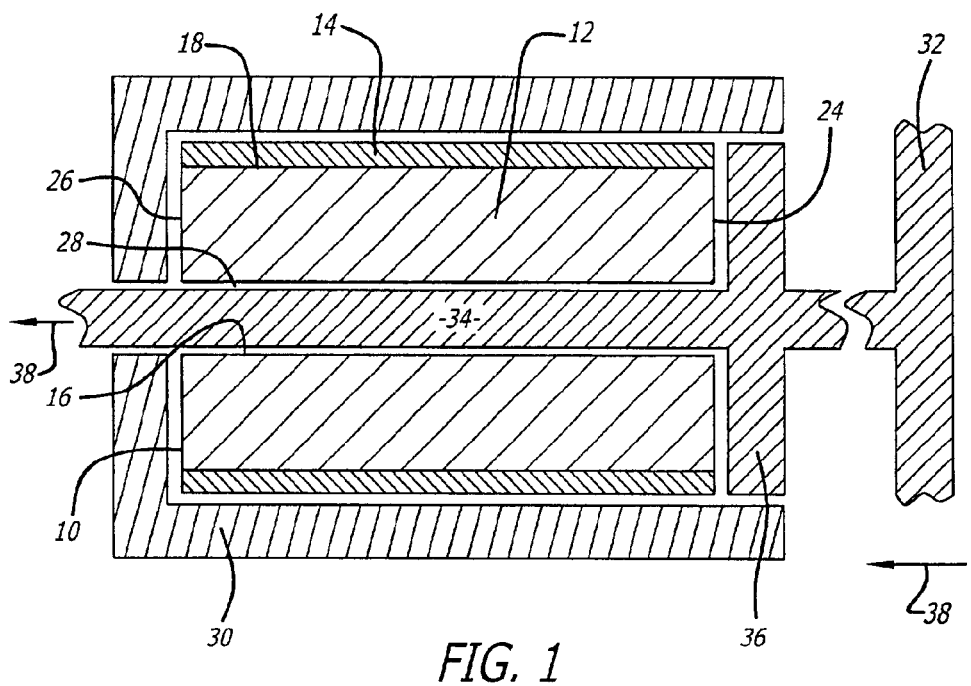
FIG. 1 shows a schematic cross sectional view of an exemplary steering system which includes a tubular honeycomb article in accordance with the present invention for absorbing energy during an impact.
Figure 3:
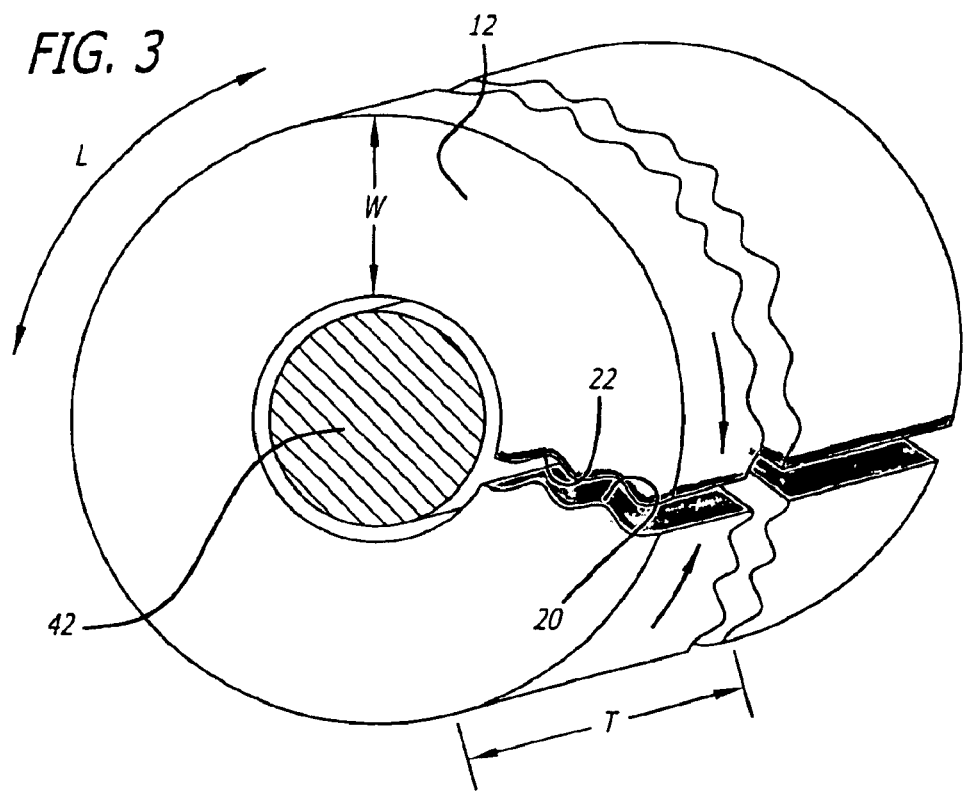
FIG. 3 is a schematic side view of a tubular honeycomb article in accordance with the present invention as it is being formed on a mandrel to provide the final honeycomb body.
Figure 4:
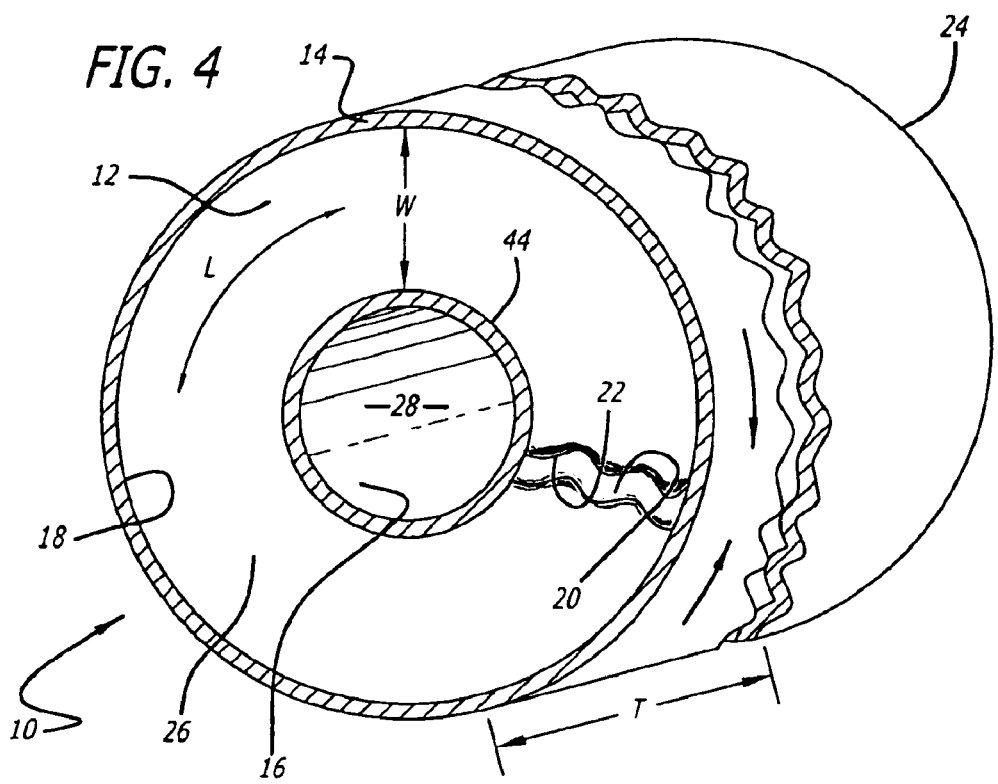
FIG. 4 is a schematic perspective view of a tubular honeycomb article in accordance with the present invention showing the tubular honeycomb body and shell located around the outer cylindrical face of the honeycomb body to provide containment of the honeycomb body in a tubular shape.

An exemplary tubular honeycomb article in accordance with the present invention is shown at 10 in FIGS. 1 and 4. The honeycomb article includes a honeycomb body 12 and a shell 14. The honeycomb body 12 includes an inner cylindrical face 16 and an outer cylindrical face 18 that define the radial width (W) of the honeycomb body 12. The honeycomb body 12 further includes a first axially extending face 20 and a second axially extending face 22. The two axially extending faces 20 and 22 determine and define the length (L) of the honeycomb body. The honeycomb body 12 further includes a first end face 24 and a second end face 26. The two end faces 24 and 26 define and determine the axial thickness (T) of the honeycomb body. As best shown in FIGS. 3 and 4, the first and second axial faces 20 and 22 are located adjacent to each other such that the inner cylindrical face 16 defines a cylindrical opening 28 that extends axially through the tube shaped honeycomb body 12.

As shown in FIG. 1, the honeycomb article is located within the housing 30 of an automobile steering column. The housing 30 is shaped to receive a steering mechanism which includes a steering wheel 32 that is connected to a steering shaft 34 that extends through the cylindrical opening 28 in the honeycomb body 12. The steering shaft 34 is connected to a mounting element or other structure 36 that is designed to connect the steering mechanism to the housing 30. During a collision, the force of the driver against steering wheel 32 forces the steering shaft 34 and mounting member 36 in the direction of arrows 38. This relative movement of the steering mechanism within housing 30 results in crushing of the tubular honeycomb article 10 and absorption of impact energy.

The preferred use of tubular honeycomb articles in accordance with the present invention is as an energy absorbing insert in steering systems for automobiles as shown in FIG. 1. However, the tubular honeycomb articles may be used in any situation where energy absorption between two impact members is desired. For example, the steering shaft mounting structure 36 may be viewed generally as a first impact member that is located adjacent to the first end face 24 of the tubular honeycomb body 12. The housing 30 may also be viewed generally as a second impact member that has an impact portion located adjacent to the second end face 26 of the honeycomb body 12. The tubular honeycomb article in accordance with the present invention provides absorption of energy when the first impact member is moved towards the second impact member resulting in crushing of the honeycomb body 12 in an axial direction and absorption of energy. Exemplary energy absorbing systems in which the tubular honeycomb article may be used include bumper systems which are designed to protect vehicles and other structures from impacts as well as any type of structure where efficient absorption of energy between two impact members or structures is required.

Tubular honeycomb articles in accordance with the present invention are made by taking a planar honeycomb and shaping it into a tube-shaped honeycomb. The tubular shape of the honeycomb is retained by providing a shell around at least a portion of the outer cylindrical face of the honeycomb. An exemplary planar honeycomb is shown generally at 40 in FIG. 2. The planar honeycomb 40 is preferably a conventional honeycomb having hexagonally shaped cells. The planar honeycomb 40 has a width (W), length (L), and thickness (T) which corresponds to the length, width and thickness of the tubular honeycomb body 12 as shown in FIGS. 3 and 4.

The tubular honeycomb body 12 is preferably made by wrapping the planar honeycomb 40 around a mandrel 42 as shown in FIG. 3. The planar honeycomb 40 is wrapped such that the first axially extending face 20 and second axially extending face 22 are located adjacent to each other. The planar honeycomb 40 in FIG. 2 has been numbered to show the correspondence between the various faces of the honeycomb body 12 and planar honeycomb 40. Specifically, the two faces of the planar honeycomb 40 that correspond to the inner cylindrical face and outer cylindrical face of the tube shaped honeycomb body have been numbered 16 and 18, respectively. The two faces of planar honeycomb 40 that correspond to the first and second axially extending faces of the honeycomb body 12 have been numbered 20 and 22, respectively, in FIG. 2. Finally, the two faces of the planar honeycomb 40 that correspond to the first and second end faces of the tube shaped honeycomb body 12 have been numbered 24 and 26, respectively, in FIG. 2.

The planar honeycomb 40 is preferably made from metals, such as aluminum which are commonly used in honeycomb designed to absorb energy. Other materials may be used, if desired, depending upon the energy absorption characteristics desired for the tubular honeycomb article. Exemplary honeycomb which is especially well suited for use in automotive steering column systems is conventional aluminum hexagonal honeycomb having one-eighth inch cells and a density of 6.1 pounds per cubic foot. Planar honeycomb with different cell sizes and densities are of course possible depending upon the particular application and desired energy absorption profile.

Figure 2:
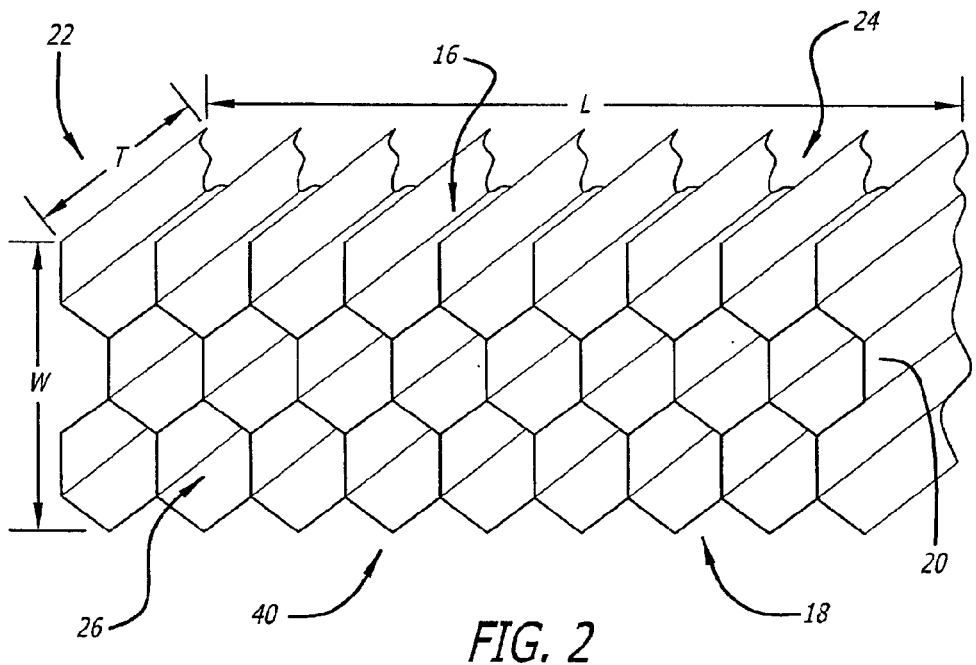
FIG. 2 is a side view of an exemplary piece of planar honeycomb prior to formation of the honeycomb into a tubular honeycomb article in accordance with the present invention.

The planar honeycomb 40 shown in FIG. 2 has two full cells. Planar honeycomb having more or less cells may be used provided that they can be formed on a mandrel or other forming device to produce a tubular shaped honeycomb body as shown in FIGS. 3 and 4. Although conventional hexagonal honeycomb is preferred, any of the honeycomb configurations commonly used for absorbing impact energy and which may be formed into a tubular shaped can be used. Examples of alternative honeycomb include over expanded (OX) honeycomb and FLEXCORE®, CR-PAA™, or HEX-WEB® honeycomb which are available from Hexcel Corp. (Dublin, Calif.).

The method for making the tubular honeycomb article involves providing a planar honeycomb as shown in FIG. 2 and wrapping it around mandrel 42 so that the axially extending faces 20 and 22 are adjacent to each other. The outer cylindrical face 18 is then wrapped with a retaining shell 14 to prevent the honeycomb from springing back towards a planar shape. The shell 14 can be any suitable material that is structurally strong enough to retain the honeycomb body in a tubular shape. A preferred shell material is heat shrinkable tubing such as INSULGRIP HS-105PVC (Insultab, Woburn, Mass.). The heat shrinkable tubing may be placed over the entire outer cylindrical face 18 or it may be applied as discrete bands at spaced axial locations. It is preferred that the shell 14 be some type of polymer which provides a cushion between the honeycomb body 12 and the steering housing 30. The use of a cushioning material reduces undesirable wear due to abrasion of the honeycomb body against the housing. In addition, the use of a cushioning shell 14 reduces or substantially eliminates noise caused by the honeycomb contacting the housing. Although heat shrinkable polymers are preferred, any polymer or other material that is sufficiently strong to maintain the honeycomb body in a tubular shape while providing a cushion between the honeycomb and housing 30 may be used. Latex tubing, rubber (natural or synthetic) bands and shrink wrap are exemplary alternative containment materials. Tapes, such as fiber reinforced tape and polyvinylchloride (PVC) tape, may also be used.

If desired, an inner protective/cushioning layer 44 may be included on the inner cylindrical face 16 of the honeycomb body 12 (see FIG. 4). The layer of protective material 44 can be in the form of discrete pieces of tape or other material which prevents the steering shaft 34 from rubbing against the inner cylindrical face 16 of the honeycomb body.

Optionally, the entire inner cylindrical face may be covered. Also, if desired, the first and second end faces 24 and 26, respectively, may be covered with a protective coating to eliminate possible abrasion and noise due to the honeycomb rubbing against the housing or steering wheel assembly. The same materials that are used to make shell 14 may also be used to make the inner protective layer 44 and/or protective coatings for the end faces.

The present invention significantly reduces the amount of honeycomb material that is required to make an energy-absorbing collar. Methods involving the machining of a cylindrical collar from a honeycomb block can produce over 50% waste. In contrast, the present invention does not waste any honeycomb material. The method is simple and is particularly well suited for large-scale assembly line production of the type typically used in the automotive industry. The present invention provides the additional advantage of a dual-purpose exterior shell that holds the honeycomb in the desired tubular shape while at the same time serving to reduce the noise and rattle that is a common problem whenever a honeycomb body is incorporated into a vibration-rich environment, such as an automobile.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A system for absorbing energy comprising:
    A) a first impact member comprising a first impact face;
    B) a second impact member comprising a second impact face; and
    C) a tubular honeycomb article located between said first and second impact members to absorb energy when said impact members are moved towards each other during a collision, said tubular honeycomb article comprising:
        a) a tubular body comprising a planar honeycomb body that has been bent into a tubular shape to form said tubular body, said planar honeycomb body comprising an inner face and an outer face that define a width of said planar honeycomb-body, said planar honeycomb body further having a first axial face and a second axial face that define a length of said planar honeycomb body and a first end face and a second end face that define a thickness of said planar honeycomb body, said planar honeycomb body including honeycomb walls that define a plurality of honeycomb cells that extend between said first end face and said second end face, said planar honeycomb body being bent so as to form said tubular body wherein said first and second axial faces are located adjacent to each other and wherein said inner face defines a cylindrical opening extending axially through said tubular body and said outer face defines an outer cylindrical surface of said tubular body and wherein said first end face is located adjacent to said first impact member and said second end face is located adjacent to said second impact member such that one or both of said first or second impact faces extends substantially radially with respect to said tubular body and wherein said honeycomb cells extend axially through said tubular body; and
        b) a shell located around the outer cylindrical surface of said tubular body and in contact therewith to provide containment of said planar honeycomb body in a tubular shape, wherein said tubular honeycomb article undergoes crushing in a substantially axial direction to provide absorption of energy when said first and second impact members are moved axially towards each other during a collision.

2. The system for absorbing energy according to claim 1 wherein said planar honeycomb body is made from a metal.

3. The system for absorbing energy according to claim 2 wherein said metal is aluminum.

4. The system for absorbing energy according to claim 1 wherein said shell is made from a heat shrinkable polymer.

5. The system for absorbing energy according to claim 1 wherein said shell is made from natural rubber, synthetic rubber, fiber reinforced tape or polyvinylchloride tape.

6. The system for absorbing energy according to claim 1 wherein said first impact member comprises a steering mechanism that comprises a steering wheel connected to a steering shaft that extends through said cylindrical opening in said tubular body and said second impact member comprises a housing in which said tubular body is located and through which said steering shaft passes, said housing being movable relative to said steering shaft.

7. A vehicle comprising the system according to claim 6 for absorbing energy when a driver of the vehicle is forced against the steering wheel.

8. The vehicle according to claim 7 wherein said planar honeycomb body is made from a metal.

9. The vehicle according to claim 8 wherein said metal is aluminum.

10. The vehicle according to claim 7 wherein said shell is made from heat shrinkable polymer.

11. The vehicle according to claim 7 wherein said shell is made from natural rubber, synthetic rubber, fiber reinforced tape or polyvinylchloride tape.

12. The vehicle according to claim 7 wherein said vehicle is an automobile.

13. The system for absorbing energy in accordance with claim 6 which further comprises a layer of protective material located on at least a portion of said inner face of said planar honeycomb body.

14. A method for absorbing energy comprising the steps of:
    A) providing the system for absorbing energy according to claim 6; and
    B) applying an impact force in the axial direction relative to said tubular body, said impact force being sufficient to crush said tubular body in said axial direction to thereby provide absorption of energy from said impact force.

15. The method for absorbing energy according to claim 14 wherein said planar honeycomb body is made from a metal.

16. The method for absorbing energy according to claim 15 wherein said metal is aluminum.

17. The method for absorbing energy according to claim 14 wherein said shell is made from heat shrinkable polymer.

18. The method for absorbing energy according to claim 14 wherein said shell is made from natural rubber, synthetic rubber, fiber reinforced tape or polyvinylchloride tape.

19. The method for absorbing energy according to claim 14 wherein a steering shaft passes through said cylindrical opening, said steering shaft being connected to a steering wheel, wherein the step of applying an impact force in the axial direction relative to said honeycomb body comprises applying an impact force against said steering wheel.

20. The system for absorbing energy in accordance with claim 1 which further comprises a layer of protective material located on at least a portion of said inner face of said planar honeycomb body.

* * * * *